United States Patent
Hong et al.

(10) Patent No.: US 9,204,004 B2
(45) Date of Patent: Dec. 1, 2015

(54) USER TERMINAL DEVICE FOR PERFORMING SCAN JOB, AND SERVER DEVICE SCAN SYSTEM INCLUDING THE SAME AND METHODS THEREOF

(75) Inventors: Jung-mo Hong, Suwon-si (KR); Hak-ju Lee, Suwon-si (KR); Dong-hoan Koo, Suwon-si (KR)

(73) Assignee: SAMSUNG ELECTRONICS CO.,LTD., Suwon-Si (KR)

( * ) Notice: Subject to any disclaimer, the term of this patent is extended or adjusted under 35 U.S.C. 154(b) by 124 days.

(21) Appl. No.: 13/463,091

(22) Filed: May 3, 2012

(65) Prior Publication Data

US 2013/0094042 A1 Apr. 18, 2013

(30) Foreign Application Priority Data

Oct. 18, 2011 (KR) .................. 10-2011-0106685

(51) Int. Cl.
*G06F 3/12* (2006.01)
*H04N 1/00* (2006.01)

(52) U.S. Cl.
CPC ....... *H04N 1/00938* (2013.01); *H04N 1/00344* (2013.01)

(58) Field of Classification Search
CPC . H04N 1/00344; H04N 1/00938; G10L 15/22
USPC .............. 358/1.13, 1.15, 1.16, 400, 402, 474, 358/475, 488, 498; 700/19; 707/736; 709/15, 19, 8; 710/15, 19, 8; 719/310, 719/321, 328
See application file for complete search history.

(56) References Cited

U.S. PATENT DOCUMENTS

| | | | | |
|---|---|---|---|---|
| 5,911,044 A * | 6/1999 | Lo et al. | ......................... | 709/203 |
| 5,933,580 A * | 8/1999 | Uda et al. | ..................... | 358/1.13 |
| 6,289,371 B1 * | 9/2001 | Kumpf et al. | ................ | 709/203 |
| 6,581,098 B1 * | 6/2003 | Kumpf | ......................... | 709/227 |
| 6,889,252 B2 * | 5/2005 | Lacome D'Estalenx | ..... | 709/220 |
| 7,146,411 B2 * | 12/2006 | Kizaki | ......................... | 709/220 |
| 7,457,008 B1 * | 11/2008 | Pearson et al. | ............... | 358/474 |
| 7,461,178 B2 * | 12/2008 | Hara et al. | ....................... | 710/8 |
| 7,712,110 B2 * | 5/2010 | Gulkis | ......................... | 719/328 |
| 8,610,935 B1 * | 12/2013 | McKinley et al. | ........... | 358/1.15 |
| 2002/0051204 A1 * | 5/2002 | Ohara | ......................... | 358/1.16 |
| 2002/0196478 A1 * | 12/2002 | Struble | ......................... | 358/474 |
| 2003/0101289 A1 * | 5/2003 | Alikberov et al. | ............ | 709/321 |
| 2003/0182278 A1 * | 9/2003 | Valk | ................................ | 707/3 |
| 2004/0186763 A1 * | 9/2004 | Smith | ............................ | 705/9 |
| 2005/0038530 A1 * | 2/2005 | Nagasaka et al. | ............. | 700/19 |
| 2006/0059496 A1 * | 3/2006 | Joy et al. | ....................... | 719/310 |
| 2008/0192294 A1 * | 8/2008 | Reddy et al. | ................. | 358/1.15 |
| 2008/0301326 A1 * | 12/2008 | Han et al. | ....................... | 710/19 |
| 2009/0067012 A1 * | 3/2009 | Iwayama | ....................... | 358/475 |
| 2009/0292708 A1 * | 11/2009 | Sato et al. | ....................... | 707/10 |

(Continued)

*Primary Examiner* — David S Cammack
(74) *Attorney, Agent, or Firm* — Staas & Halsey LLP

(57) ABSTRACT

A scan system is provided. The system includes a server device having at least one scanner driver and a user terminal device which accesses the server device and receives a scanner list, and if a scanner is selected from the scanner list, transfers scanner information about the selected scanner to the server device. The server device may control the scanner to process a scan job, by using a scanner driver corresponding to the scanner information transferred from the user terminal device. Accordingly, the user can use scan service easily by using one scan application, without having to install scan application for each of the scanners at the user terminal device.

20 Claims, 10 Drawing Sheets

(56) References Cited

U.S. PATENT DOCUMENTS

| | | | |
|---|---|---|---|
| 2010/0046023 A1* | 2/2010 | Hong | 358/1.15 |
| 2010/0073730 A1* | 3/2010 | Park | 358/402 |
| 2011/0075225 A1* | 3/2011 | Ding et al. | 358/474 |
| 2011/0161322 A1* | 6/2011 | Shigeeda | 707/736 |

* cited by examiner

FIG. 7

| Communication Protocol (SOAP, CORBA, ...) |
|---|

```
POST /InStock HTTP/1.1
Host : www. mobilescan.com
Content-Type: application/soap+xml; charset=utf-8
Content-Length: 100
SOAPAction: "http://www.w3.org/2003/05/soap-envelope"

<?xml version="1.0"?>
<soap:Envelope xmlns:soap="http://w3.org/2003/05/soap-envelope">
  <soap:Header>
  </soap:Header>
  <soap:Body>
    <m:Transfer xmlns:m="http://www.mobilescan.com/data">
      <m:PageCount>1</m:PageCount>
      <m:PendTransfer>Yes</m:PendTransfer>
    </m:OpenSource>
  </soap:Body>
</soap:Envelope>

Content-Type: image/jpeg
Content-Size: 1926580
????$$$??????ffffff
....Attachment...
```

USER TERMINAL DEVICE FOR PERFORMING SCAN JOB, AND SERVER DEVICE SCAN SYSTEM INCLUDING THE SAME AND METHODS THEREOF

CROSS-REFERENCE TO RELATED APPLICATIONS

This application claims the priority benefit from Korean Patent Application No. 10-2011-0106685, filed on Oct. 18, 2011, in the Korean Intellectual Property Office, the disclosure of which is incorporated herein by reference in its entirety.

BACKGROUND

1. Field

Embodiments relate to scanning, and more particularly, to a user terminal device and a server device capable of performing scan job without requiring a plurality of scan applications installed for respective scan devices, a scan system including the same and scan methods thereof.

2. Description of the Related Art

A variety of types of electronic devices have been developed and distributed according to the advancement of electronic technology. Among them, small user terminal devices such as smartphones integrating therein state-of-the-art functions have received exploding attentions.

Various types of applications are installed on the user terminal devices to provide users with satisfactory services. The user terminal devices can also provide the users with multimedia contents.

As the user terminal devices have provided more sophisticated functions, users can utilize the terminal devices in various manners. By way of example, a user can utilize a scan service with his user terminal device.

In order to implement the scan service, a scanner driver or scan application has to be installed on the user terminal device. The scan application is provided by the scanner manufacturer, and used to access a scanner and transmit and receive data and commands.

A user intending to use a scan service has to download a scan application from a recording medium provided by a scanner manufacturer or from the website of the scanner manufacturer and install the downloaded application.

The scan application varies depending on the type of the scanner or the manufacturer of the scanner. Accordingly, a user intending to use various types of scanners has to install all the scan applications corresponding to the respective scanners.

Even if the scan applications for the respective scanners have been installed, the user still has difficulty, since different applications are used in different ways.

SUMMARY

Embodiments provide a user terminal device and a server device capable of using a scan service easily with only one scan application, i.e., without having to install a corresponding scan application every time the scan service is used, a scan system including the same, and scan methods thereof.

According to one or more embodiments, there is provided a server device, which may include a first interface unit which is connectable to a user terminal device, a second interface unit which is connected to one or more scanners, a storage unit which stores therein a scanner driver corresponding to the one or more scanners connected to the second interface unit, and a control unit which transfers a scanner list, which is a list of scanners connected to the second interface unit, to the user terminal device upon the connection of the user terminal device via the first interface unit to the server device, wherein, if the scanner is selected at the user terminal device, the control unit executes the scanner driver corresponding to the selected scanner is executed to perform a scan job.

If the scan job is carried out at the scanner and scan data is received through the second interface unit, the control unit may transfer the scan data to the user terminal device via the first interface unit.

If the scan job is carried out at the scanner and scan data is transferred via the second interface unit, the control unit may store the scan data at the storage unit.

If the user terminal device is connected through the first interface unit, the control unit may acquire a scanner list corresponding to the respective scanner drivers stored at the storage unit through TWAIN Data Source Manager (DSM).

If scanner information about the scanner selected from the scanner list and scan option information are received through the first interface unit, the control unit may control so that the scanner driver corresponding to the scanner information is loaded and executed, and the scan option information is provided to the executed scanner driver for processing of the scan job according to the scan option information.

The control unit may close the scanner driver if the scan job is completed, and unload the scanner driver if the user terminal device is disconnected.

The storage unit may store a scan stub module which is accessible to the scanner driver, and the control unit may control the scanner using the scan stub module to process the scan job.

The control unit may assign priorities to the respective scanners according to use status of the scanners connected to the second interface unit, or according to whether or not a document is mounted (placed) on the scanners, and generates the scanner list including the priorities.

The control unit may accumulatively store scan job history information of the user terminal device that uses the scan job, at the storage unit.

According to one or more embodiments, there is provided a user terminal device which may include a communication interface unit which is connected to a server device and receives a scanner list, a user interface unit which displays the scanner list, a control unit which transfers information about a selected scanner, which is selected from the scanner list to the server device, a data processing unit which processes received data, if a scan job of the scanner is processed by a scanner driver provided at the server device and data scanned at the scanner is received through the server device, and a storage unit which stores data processed at the data processing unit.

The storage unit may store therein a scan proxy module. Accordingly, if a scan command is inputted, the control unit may transfer the scan command to the server device using the scan proxy module. The scan proxy module may be a software which can access the scan stub module stored at the server device, and the scan stub module may be a software which can access one or more scanner drivers stored at the server device.

Upon receipt of a scan command, the control unit may control the user interface unit to display a user interface (UI) to receive an identification (ID) and a password, The control unit may control the communication interface unit to transfer the ID and the password inputted through the UI to the server device.

According to one or more embodiments, there is provided a scan system, which may include a server device having one or more scanner drivers, and a user terminal device which accesses the server device and receives a scanner list, and if a scanner is selected from the scanner list, transfers scanner information about the selected scanner to the server device. The server device may control the scanner to process the scan job using a scanner driver corresponding to the scanner information transferred from the user terminal device.

The server device may drive a scanner driver corresponding to the selected scanner by executing a scan stub module which can access the one or more scanner drivers, and the user terminal device may execute a scan proxy module which can access the scan stub module to access the server device.

According to one or more embodiments, there is provided a method for performing a scan using a server device, which may include if a user terminal device is connected, transferring a scanner list corresponding to a prestored scanner driver to the user terminal device, if a scanner is selected at the user terminal device, executing a scanner driver corresponding to the selected scanner, and controlling the selected scanner using the scanner driver to process a scan job.

The method may additionally include, if the scan job is processed at the scanner, receiving scan data from the scanner, and transferring the scan data to the user terminal device.

The method may additionally include, if the scan job is processed at the scanner, receiving scan data from the scanner, and storing the received scan data.

The scanner list may be generated by acquiring information about the prestored scanner driver through TWAIN Data Source Manager (DSM).

The executing may include receiving scanner information about the scanner selected from the scanner list and scan option information from the user terminal device, loading a scanner driver corresponding to the scanner information and executing the loaded scanner driver, and providing the scan option information to the executed scanner driver. The scanner driver may be executed by a scan stub module which can access the scanner driver, and the scan stub module and the scanner driver may be connected according to Technology Without an Important Name (TWAIN) or Windows Image Acquisition (WIA).

The method may additionally include, if the scan job is completed, closing the scanner driver, and if the user terminal device is disconnected, unloading the scanner driver.

According to one or more embodiments, there is provided a method for performing a scan using a user terminal device, which may include connecting communication to a server device, receiving a scanner list from the server device, displaying the scanner list, selecting a scanner to use from the scanner list, transferring information about the selected scanner to the server device, if scanning is performed at the scanner by the scanner driver provided at the server device, receiving scan data through the server device, and storing the received scan data.

According to one or more embodiments, there is provided a method for performing a scan using a scan system, which may include accessing, at a user terminal device, a server device which includes one or more scanner drivers, receiving, at the user terminal device, a scanner list from the server device, if a scanner is selected from the user terminal device, transferring, at the user terminal device, the selected scanner information to the server device, and controlling, at the server device, the scanner using the scanner driver corresponding to the scanner information transferred from the user terminal device to thereby process a scan job.

According to one or more embodiments, the user can use scan service easily by using one scan application, without having to install scan application for each of the scanners at the user terminal device.

According to one or more embodiments, there is provided at least one computer readable medium storing computer readable instructions to implement methods of one or more embodiments.

BRIEF DESCRIPTION OF THE DRAWINGS

The above and/or other aspects of embodiments will be more apparent by describing embodiments with reference to the accompanying drawings, in which:

FIG. 7 is a view provided to explain a communication method between the user terminal device and the server device;

DETAILED DESCRIPTION

Figure 1:
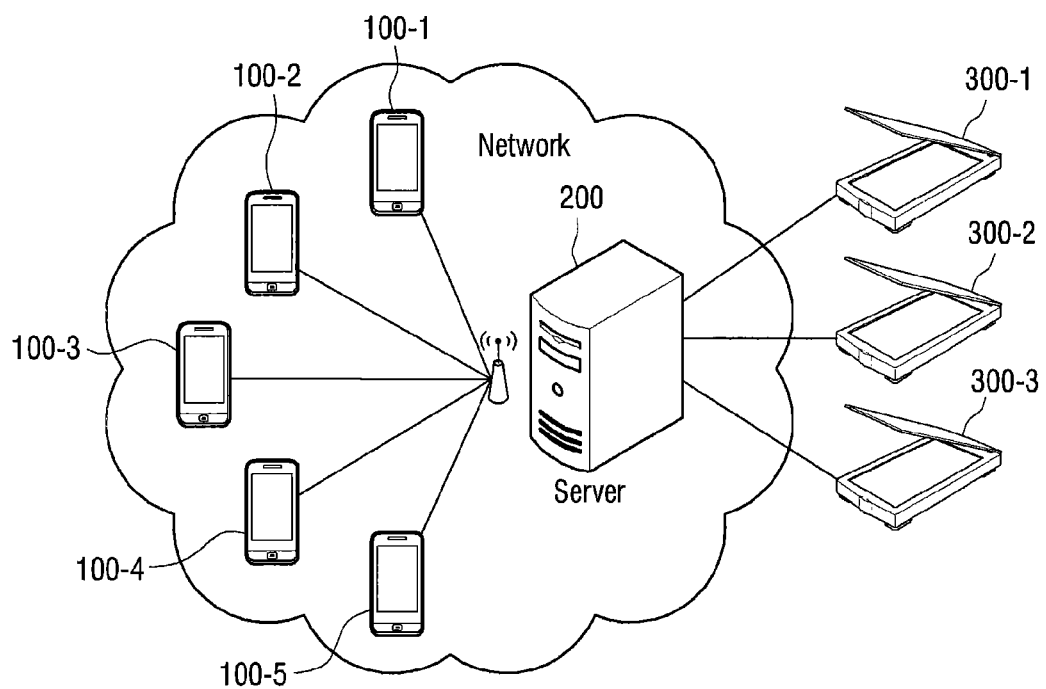
FIGS. 1 and 2 are views illustrating the structure and operation of a scan system according to an embodiment.

Reference will now be made in detail to embodiments, examples of which are illustrated in the accompanying drawings, wherein like reference numerals refer to like elements throughout. Embodiments are described below by referring to the figures.

In the following description, same drawing reference numerals are used for the same elements even in different drawings. The matters defined in the description, such as detailed construction and elements, are provided to assist in a comprehensive understanding of embodiments. Thus, it is apparent that embodiments can be carried out without those specifically defined matters. Also, well-known functions or constructions are not described in detail since they would obscure embodiments with unnecessary detail.

FIG. 1 illustrates a scan system according to an embodiment. Referring to FIG. 1, the scan system may include user terminal devices 100-1, 100-2, 100-3, 100-4, and 100-5, and a server device 200. The user terminal devices 100-1, 100-2, 100-3, 100-4, and 100-5 and the server device 200 may be connected to a network. The server device 200 may be connected to scanners 300-1, 300-2, and 300-3.

The user terminal devices 100-1, 100-2, 100-3, 100-4, and 100-5 herein refer to devices with communication function and which are connectable to the server device 200. By way of example, the user terminal devices 100-1, 100-2, 100-3, 100-4, and 100-5 may be implemented as various devices such as PCs, laptop computers, tablet PCs, mobile phones, PDAs, or MP3 players. While FIG. 1 shows a plurality of user terminal devices and scanners, according to an embodiment, there may be one user terminal device and one scanner. In addition, while FIG. 1 shows five user terminal devices and three scanners, according to an embodiment, there may be any number of user terminal devices and scanners.

Various types of scanners 300-1, 300-2, and 300-3 provided by various manufacturers may be implemented.

The server device 200 may include scanner drivers corresponding to the respective scanners 300-1, 300-2, 300-3. Each scanner driver may control a corresponding scanner according to the Technology Without an Important Name (TWAIN) or Windows Image Acquisition (WIA)

TWAIN is the standard software protocol implemented to enable communication between application program and imaging device such as scanner. The scanner driver including TWAIN, i.e., the TWAIN driver transmits the data constructed by the software constructing elements such as the application program, source manager, or source to the scanner. Further, the commands and instructions on the hardware levels provided for each scanner are the ones that are specified to the driver provided by each manufacturer. Since this portion is processed at the source provided on the TWAIN driver, on the application program, it is possible to use the scanner using the TWAIN driver, without having to load the driver for the scanner separately.

WIA is the interface standard which provides stable communication between the application program and the scanner. WIA architecture is constructed of Application Programming Interface (API) and Device Driver Interface (DDI).

Each user terminal devices 100-1, 100-2, 100-3, 100-4, and 100-5 communicates with the server device 200 using one scan application that utilizes scan proxy, without having to install scan application provided by the scanner manufacturer. The user terminal devices 100-1, 100-2, 100-3, 100-4, and 100-5 may perform scanning by driving the scanner using the scanner driver provided in the server device 200.

A method of one of the user terminal devices 100-1, 100-2, 100-3, 100-4, and 100-5 (i.e., user terminal device 100-1) for performing scanning will be explained below. The user of the user terminal device 100-1 accesses the server device 200 by manipulating one scan application that utilizes the scan proxy. The server device 200 transmits a scanner list to the user terminal device 100-1 to which the user accesses. The 'scanner list' herein may refer to a list of information about various scanner drivers provided at the server device 200 and scanners which correspond to the scanner drivers.

In various embodiments, the server device 200 may generate various types of scanner lists. By way of example, the server device 200 may apply priority to the scanners according to user status thereof in incorporating the scanners on a scanner list. That is, if the first scanner 300-1 is being used more frequently than others, the server device 200 may display the lowest priority for the first scanner 300-1, while displaying higher priority for the other scanners 300-2, 300-3, so as to guide the users to select the scanner that can be used quickly.

In an embodiment, the server device 200 may apply priority to the scanners depending on whether a document is mounted (placed) on the scanners or not, and reflect the result into the scanner list. That is, if a document is mounted on the second scanner 300-2, the second scanner 300-2 may be given the highest priority. Accordingly, if a user mounts a document on the scanner, the user may then check the priority on the scanner list and accurately select the scanner to use.

In an embodiment, the server device 200 may construct the scanner list according to the use status of the scanner, or whether or not a document is mounted (placed) on the scanner. That is, the scanner list may represent only the available scanners, or the scanners on which documents are mounted.

The user terminal device 100-1 may display the scanner list when the scanner list is received for the user to select. If the user selects one scanner out of the scanner list, the user terminal device 100-1 transmits the scanner information of the selected scanner to the server device 200.

The server device 200 activates the scanner driver corresponding to the selected scanner using the scanner information. The scanner driver drives the corresponding scanner to perform scan job. The scan data obtained as a result of operation of the scanner is provided to the server device 200. Depending on embodiments, the server device 200 may store the received scan data in the server device 200, or transfer the received scan data to the user terminal device 100-1. Further, the server device 200 may transfer the received scan data to another device designated by the user terminal device 100-1.

A user may set a password for the scan job using his user terminal device. That is, the user may input his own ID and password. If the password is set, the server device 200 may request the user to input password before transmitting the scan data. Accordingly, the scan data can be transmitted only for the user terminal device to which the user inputs accurate ID and password. Alternatively, if the server device 200 stores therein scan data, the server device 200 may request the user to input ID and password upon receiving a confirm request or a transfer request for the scan data. Accordingly, if the user does not input accurate ID and password, the server device 200 may refuse the scan data confirm and transfer requests. As explained above, security of scan data can be maintained using ID and password.

In an embodiment, the server device 200 may record a history of scan jobs performed at the respective user terminal devices. A manager may check and manage the history of scan jobs performed.

Figure 2:
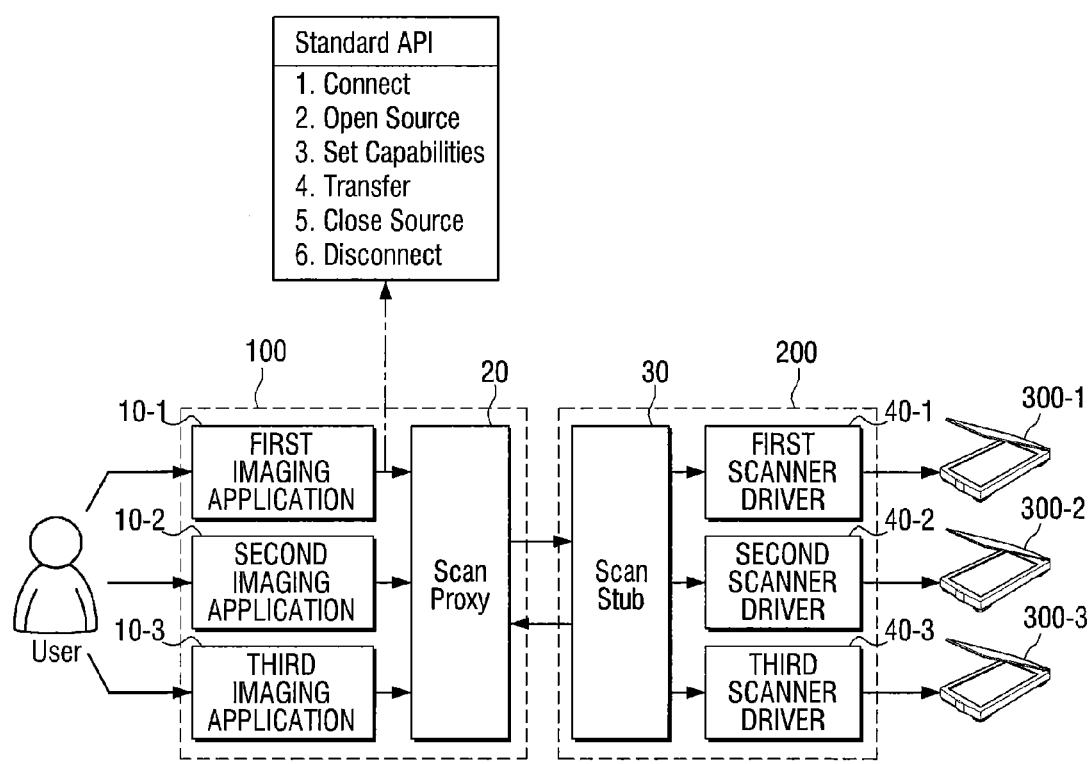

FIG. 2 is a view provided to explain in detail a method for performing scan at the scan system of FIG. 1.

Referring to FIG. 2, the user terminal device 100 includes a plurality of imaging applications 10-1, 10-2, and 10-3 and a scan proxy module 20. While FIG. 2 shows a plurality of imaging applications, according to an embodiment, there may be one imaging application. In addition, while FIG. 2 shows three imaging applications, according to an embodiment, there may be any number of imaging applications.

The 'imaging applications' 10-1, 10-2, and 10-3 refer to various types of applications provided at the user terminal device 100 and use images. The 'scan proxy module' 20 refers to a software which accesses the scan stub module 30 in the server device 200 on behalf of the image application to drive the first to third scanner drivers 40-1, 40-2, and 40-3. While FIG. 2 shows a plurality of scanner drivers, according to an embodiment, there may be one scanner driver. In addition, while FIG. 2 shows three scanner drivers, according to an embodiment, there may be any number of scanner drivers.

The server device 200 has the scan stub module 30 and a plurality of scanner drivers 40-1, 40-2, and 40-3. Each of the scanner drivers 40-1, 40-2, and 40-3 is the driver program of each of the plurality of scanners 300-1, 300-2, and 300-3.

While activating and using one of the imaging applications 10-1, 10-2, and 10-3, the user may input a scan command depending on need.

The imaging application transfers a scan command to the scan proxy module 20. The standard Application Programming Interface (API) may apply between the first to third imaging applications 10-1, 10-2, and 10-3 and the scan proxy module 20. The standard API refers to the interface predetermined by the operating system or other application to be provided to the application.

Referring to FIG. 2, an imaging application (10-1, 10-2, or 10-3) may transfer to the scan proxy module 20 various commands including a command to connect to the server 200 by the standard API (1. Connect), a command to activate a scanner driver (2. Open source), a command to set scan option (3. Scan capabilities), a command to transfer data (4. Transfer), a command to close the scanner driver (5. Close source), or a command to disconnect (6. Disconnect).

The scan proxy module 20 transfers the command transferred from the imaging application to the scan stub module 30 of the server device 200. The scan proxy module 20 may communicate with the scan stub module 30 according to the Simple Object Access Protocol (SOAP), or Common Object Request Broker Architecture (CORBA).

If a command to connect is received from the scan proxy module 20, the scan stub module 30 of the server device 200 generates a list of the stored scanner drivers. In an embodiment, the scan stub module 30 may acquire information about the scanner drivers through the TWAIN DSM (Data Source Manager) and generate a list.

The scan stub module 30 transfers the acquired scanner list to the scan proxy module 20. The scan proxy module 20 displays the transferred scanner list on the screen of the user terminal device 100. If the user selects one out of the scanner list, the scan proxy module 20 provides the scan stub module 30 with a command to execute including the information about the selected scanner.

The scan stub module 30 loads a scanner driver corresponding to the selected scanner and executes the same. The scan stub module 30 also provides the scanner driver with scan options according to a command to set scan option which is transferred from the scan proxy module 20.

Accordingly, the scanner driver controls the scanner to perform the scan job according to the scan option.

After that, if a command to transfer the data is received from the scan proxy module 20, the scan stub module 30 transfers the scan data to the scan proxy module 20.

If a command to close the scanner driver is transferred, the scan stub module 30 closes the corresponding scanner driver, and if a command to disconnect is transferred, unloads the scanner driver and disconnects from the scan proxy module 20.

Although FIG. 2 illustrates an example in which three imaging applications are provided in the user terminal device 100 and three scanner drivers are provided in the server device 200, the number of the imaging applications or scanner drivers is not limited to any specific examples. Accordingly, in an embodiment, one imaging application or one scanner driver may be provided.

Further, although an example in which TWAIN driver is implemented is explained, in another example, other drivers such as WIA driver may be implemented.

Even when a scan system includes a plurality of different user terminal devices 100 as illustrated in FIGS. 1 and 2, by installing the scan proxy module 20 on the respective user terminal devices 100, it is possible to selectively use various models of scanners without having to install corresponding scan applications separately. As a result, user convenience increases.

Figure 3:
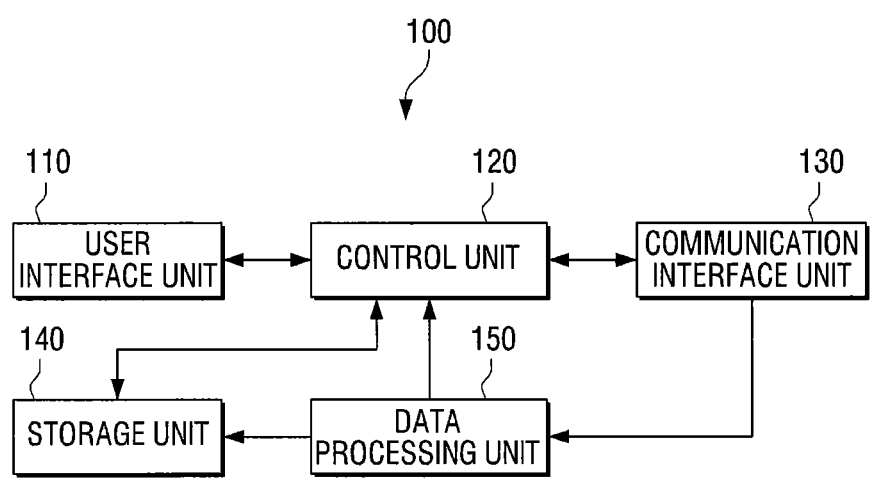
FIG. 3 is a block diagram of a user terminal device according to an embodiment.

FIG. 3 is a block diagram of a user terminal device according to an embodiment. Referring to FIG. 3, the user terminal device 100 may include a user interface unit 110, a control unit 120, a communication interface unit 130, a storage unit 140, and a data processing unit 150.

The user interface unit 110 is configured to receive input of various commands or information from the user, and provide various information to the user by outputting a user interface (UI) screen. The user interface unit 110 may include a display panel, or a key input. The display panel may be implemented as a touch screen so that a user can directly input a user command by selecting on the screen.

The control unit 120 performs various control jobs according to the user commands inputted through the user interface unit 110.

The communication interface unit 130 performs communication with the server device 200. As explained above, the communication interface unit 130 may communicate with the server device 200 according to the SOAP or CORBA.

The communication interface unit 130 accesses the server device 200 and receives the scanner list.

The control unit 120 controls the user interface unit 110 to display the received scanner list. The user may select the scanner he intends to use, from the scanner list displayed on the user interface unit 110.

If the scanner is selected, the control unit 120 controls the communication interface unit 130 to transfer the information about the selected scanner to the server device 200.

Accordingly, the scanner may perform a scan job according to the scanner driver provided in the server device 200. The scan data may be received at the communication interface unit 130 through the server device 200.

The data processing unit 150 processes the received scan data. By way of example, the data processing unit 150 may perform various image processing including scaling, resolution adjustment, or the like.

The storage unit 140 may store the data processed at the data processing unit 150.

The operation of the control unit 120 explained above may be implemented by executing the scan proxy module 20. That is, the storage unit 140 may store the scan proxy module 20 and at least one imaging application.

The control unit 120 executes the imaging application stored at the storage unit 140 according to the user's selection. If a scan command is inputted during the processing of the imaging application, the control unit 120 executes the scan proxy module and transfers the scan command to the server device 200. The scan proxy module 20 refers to the software that can access the scan stub module 30 stored at the server device 200.

As explained above, since the scan stub module 30 can access at least one scanner driver stored at the server device 200, the control unit 120 may drive the respective scanner drivers using the scan proxy module 20.

In an embodiment, if ID and password are set for the scan job, the control unit 120 may control the user interface unit 110 to display the UI requesting the user to input ID and password upon receiving a command to scan. Accordingly, the inputted ID and password may be transmitted to the server device 200 via the communication interface unit 130.

Figure 4:
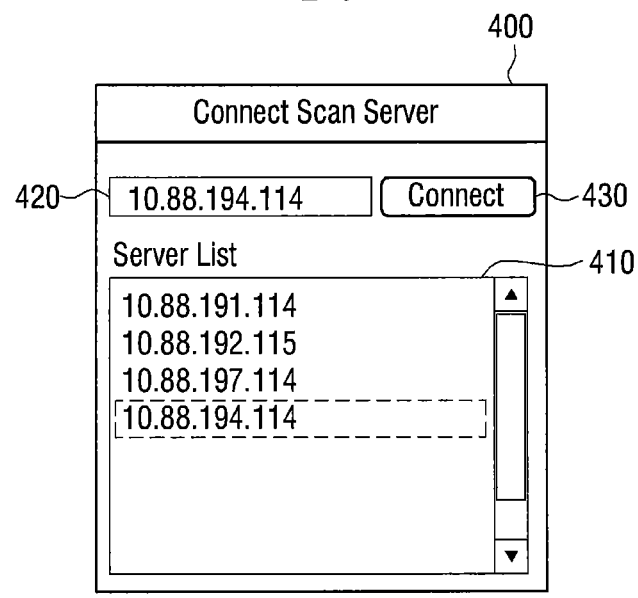
FIG. 4 illustrates a UI provided to connect the user terminal device to the server device.

FIG. 4 illustrates an example of a UI through which a user selects a server device to access from the user terminal device.

If a request for scan service is inputted, referring to FIG. 4, the control unit 120 controls the user interface unit 110 to display a UI 400 including a list of accessible server devices.

The UI 400 may include a list region 410 for displaying a list of accessible server devices, a display region 420 for displaying information about the server device selected from the list, or a command region 430 for inputting an access command to the server device displayed on the display region 420.

Although Internet Protocol (IP) addresses of the respective server devices are displayed on the list region 410 in FIG. 4, this is illustrated only as examples. Accordingly, in one ore more embodiments, other information such as names of the server devices, manufacturers of the server devices, or other preset identification information may be used instead of the IP addresses.

Figure 5:
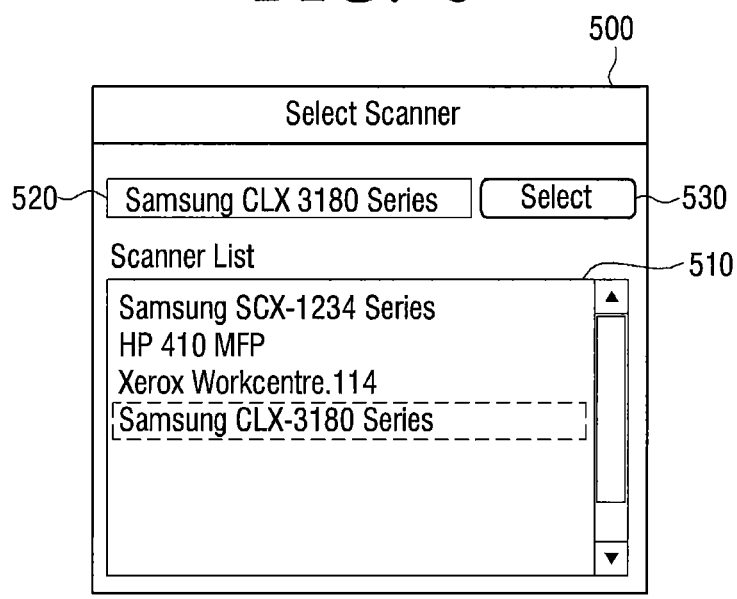
FIG. 5 illustrates a UI on which a scanner list is displayed.

If the server device is selected, the user terminal device 100 accesses the corresponding server device and receives a scanner list. FIG. 5 illustrates the UI displaying the scanner list.

Referring to FIG. 5, the UI 500 may include a list region 510 for displaying the scanner list, an indicating region 520 for indicating information about the scanner selected from the list region 510, or a command region 530 for inputting a select command to select the scanner indicated on the indicating region 520. Although the device names of the respective scanners are displayed on the list region 510 of FIG. 5, various other formed of information, such as location information of the scanner, or identification information provided by the user or manager may also be implemented.

Figure 6:
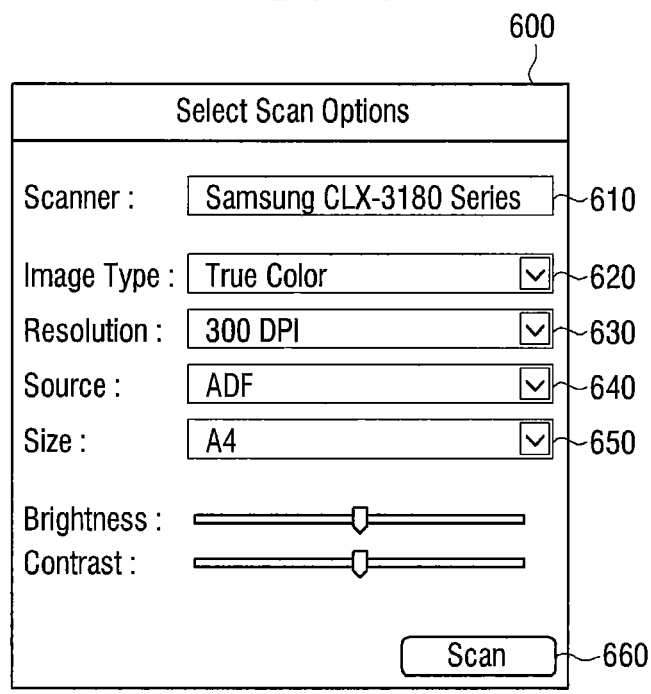
FIG. 6 illustrates a UI provided to set scan option.

If the user selects the scanner, the control unit 120 may control the user interface unit 110 to display the UI to set the scan option. FIG. 6 illustrates the construction of the UI according to an embodiment.

Referring to FIG. 6, the UI 600 may include a display region 610 for displaying scanner information, an image type region 620 for setting image type, a resolution region 630 for setting resolution, a source region 640 for displaying source information, a size region 650 for displaying size information, or a command region 660 for input scan command. The user may set the respective scan options as he desires, and select the command region 660 to input a scan command.

The control unit 120 transfers the scan command including the set scan option information and the scanner information to the server device 200 through the communication interface unit 130.

Although the information such as scan option information or scanner information may be transferred as one integrated scan command, other embodiments are possible. Accordingly, in an embodiment, the scan option information and the scanner information may be included in different signals and transmitted respectively to the server device 200.

FIG. 7 illustrates a data format according to the communication protocol used between the user terminal device 100 and the server device 200 according to an embodiment. Although SOAP is used in FIG. 7, other embodiments may also be implemented.

Figure 8:
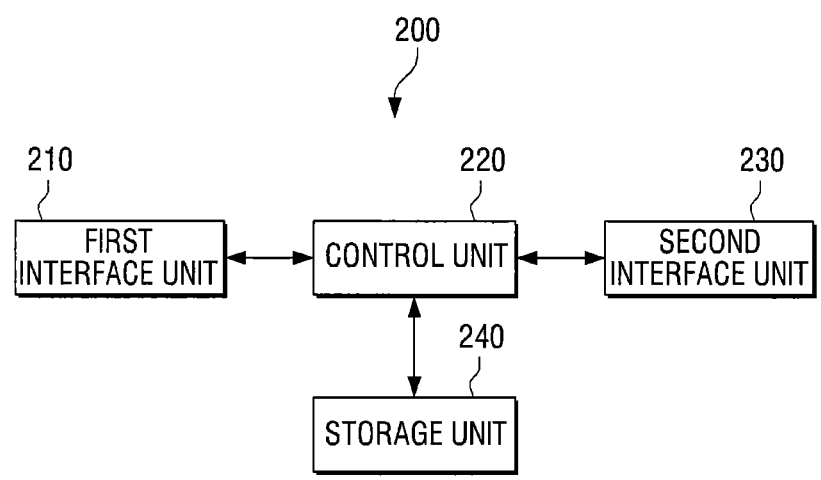
FIG. 8 is a block diagram of a server device according to an embodiment.

FIG. 8 is a block diagram of the server device 200 according to an embodiment. Referring to FIG. 8, the server device 200 may include a first interface unit 210, a control unit 220, a second interface unit 230 and a storage unit 240.

The storage unit 240 stores therein at least one scanner driver to access the scanner.

The first interface unit 210 may be connected to the user terminal device.

The second interface unit 230 may connect the server device 200 to the respective scanner. The second interface unit 230 may be connected to the scanner according to various wired/wireless communication protocols.

If the user terminal device 100 is connected via the first interface unit 210, the control unit 220 transfers the scanner list corresponding to the scanner driver stored in the storage unit 240 to the user terminal device 100. Accordingly, if the scanner is selected from the user terminal device 100, the scanner driver corresponding to the selected scanner is executed.

According to the executing of the scanner driver, the control unit 220 can control the scanner. That is, the scanner driver accesses the scanner and performs a scan job.

The data scanned at the scanner is transmitted to the server device 200 via the second interface unit 230.

If the scan data is received from the scanner, the control unit 220 may transmit the received scan data to the user terminal device 100 via the first interface unit 210.

In an embodiment, if the scan data is received from the scanner, the control unit 220 may store the scan data at the storage unit 240. Accordingly, if a request for transferring the scan data is separately inputted from the user, the control unit 220 may provide the user with the requested scan data. Alternatively, if the server device 200 is provided with a display (not illustrated), in response to a user's request for confirming scan data inputted through the server device 200 or the user's user terminal device 100, the control unit 220 may display the scan data on the display. As explained above, the scan data may be utilized in various manners.

If the user terminal device is connected to the first interface unit 210, the control unit 220 may acquire a scanner list corresponding to the scanner drivers stored in the storage unit 240 through the TWAIN DSM.

After that, if the scanner information and scan option information selected from the scanner list is received via the first interface unit 210, the control unit 220 loads a scanner driver corresponding to the received scanner information and executes the scanner driver. The control unit 220 then provides the scan option information received from the user terminal device 100 to the executed scanner driver. The scanner driver controls the scanner to perform the scan job according to the scan option information.

If a scan job is completed, the control unit 220 closes the scanner driver. In addition, if a connection to the user terminal device is completed, the control unit 220 unloads the scanner driver.

Further, depending on embodiments, the control unit 220 may give priorities to the scanners according to the use status of the scanners or presence or absence of documents mounted on the scanners, and generate a scanner list reflecting the priorities.

In an embodiment, the control unit 220 may accumulatively store the history information of the scan jobs of the user terminal device that uses the scan jobs at the storage unit 240. Accordingly, it is possible to provide the scan job history upon request by the user or manager.

In an embodiment, if information on ID and password is received from the user terminal device, the control unit 220 may store the received information at the storage unit 240. Accordingly, it is possible to process user authentication using the storage ID and password in providing the scan data.

Various operations of the control unit 220 explained above may be implemented by executing the scan stub module stored at the storage unit 240. That is, the storage unit 240 stores the scan stub module which can access the scanner driver, and the control unit 220 may perform a scan job by executing the scan stub module.

Figure 9:
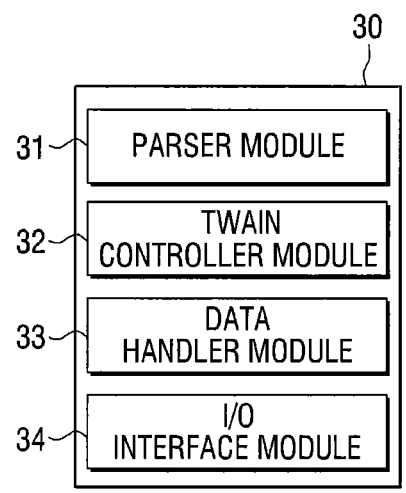
FIG. 9 illustrates a structure of a control unit of the server device according to an embodiment.

FIG. 9 illustrates an example of the scan stub module.

Referring to FIG. 9, the scan stub module 30 may include a parser module 31, a TWAIN controller module 32, a data handler (processing) module 33, and an I/O interface module 34.

The parser module 31 parses a command received from the scan proxy module which is executed on the user terminal device 100. The command received from the scanner driver is converted into a form that can be perceived at the scan proxy module.

The TWAIN controller module 32 converts the parsed command to a form perceivable at the scanner driver according to the TWAIN. Accordingly, the converted command is transferred to the scanner driver and the scan job is performed through the scanner driver.

The data handler module 33 is provided to manage the scan data obtained at the scanner under control of the scanner driver. That is, depending on embodiments, the data handler module 33 may control so that the scan data is transferred to the user terminal device 100 or stored at the storage unit 240 of the server device 200.

The I/O interface module 34 controls the interfacing job to transfer the scan data to the scan proxy module 20 or transmit and receive commands.

The control unit 220 may perform a scan job using the scan stub module 30 as the one illustrated in FIG. 9. Accordingly, in an environment where different types of scanners are provided, scan service is used conveniently and without having to install the corresponding scan applications of the respective scanners on the user terminal device.

Figure 10:
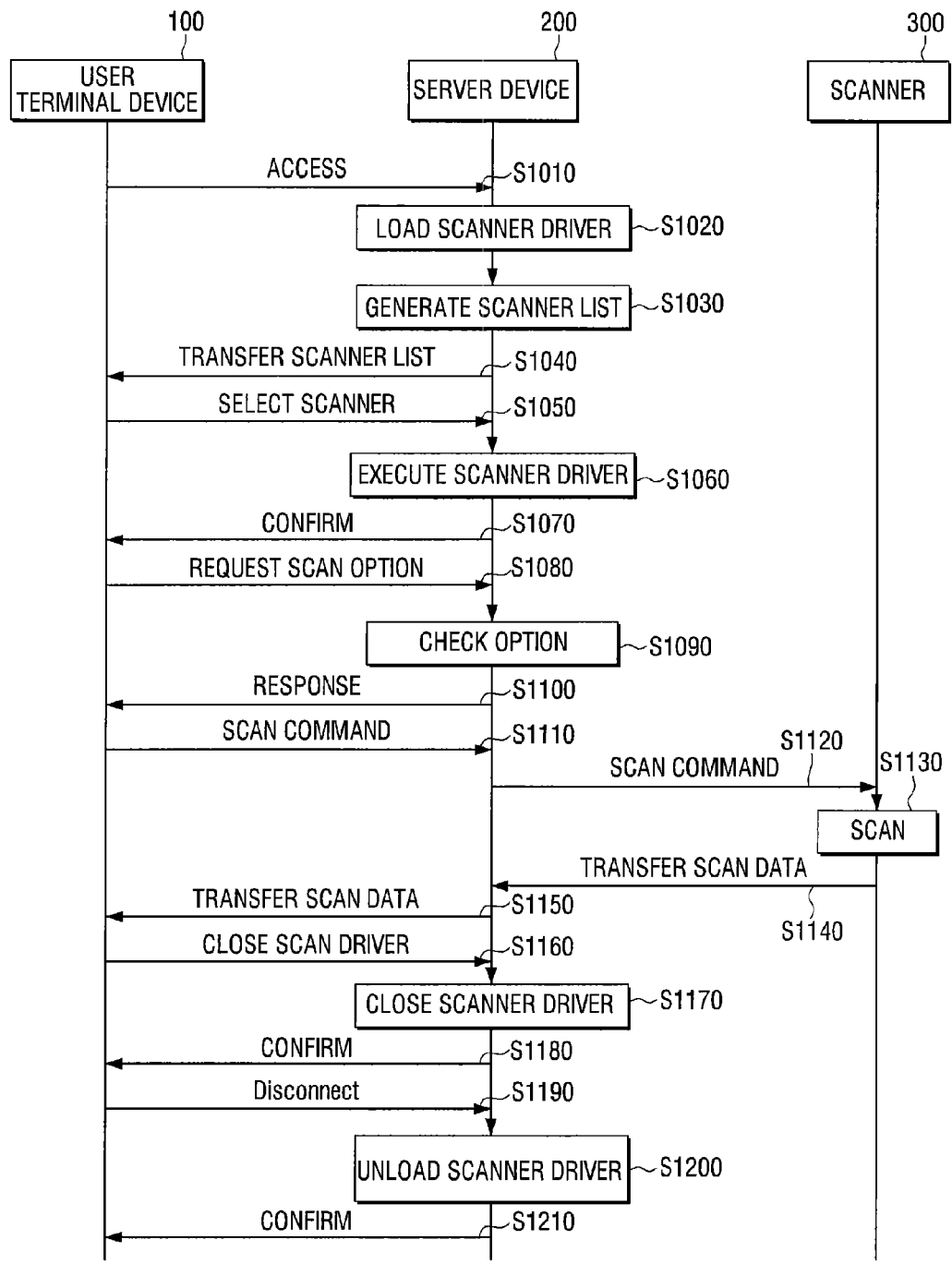
FIG. 10 is a view provided to explain a method for performing scanning according to various embodiments.

FIG. 10 is a flowchart provided to explain a method for performing scanning according to various embodiments.

Referring to FIG. 10, if the user executes the application on the user terminal device 100 and then inputs a scan command, the scan proxy module is executed. The scan proxy module provides a user interface (UI) to select the server device. The user may select the server device and press a connect button on the UI. As a result, at S1010, the user terminal device 100 accesses the server device 200. In addition, the user may access the server device 200 by directly executing the scan proxy module. The UI to select the server device may be configured in the form as illustrated in FIG. 4, but not limited thereto.

If the user terminal device is accessed, the server device 200 executes the scan stub module and supports the scan service. That is, at S1020, the server device 200 loads the scanner driver, and at S1030, generates a scanner list. The TWAIN DSM may be implemented.

At S1040, after converting the generated scanner list into the communication protocol to be used with the user terminal device 100, the server device 200 transfers the converted scanner list to the user terminal device 100.

The user terminal device 100 displays the scanner list for the user to select. At S1050, information about the scanner selected by the user is transmitted to the server device 200.

At S1060, the server device 200 executes a scanner driver corresponding to the scanner selected by the user, using TWAIN DSM.

At S1070, a response signal, indicating that the scanner driver is executed, is transmitted to the user terminal device 100 (confirms execution).

At S1080, the user terminal device requests information about the scan option supported by the scanner. At S1090, the server device 200 acquires information about the scan options of the selected scanner through TWAIN DSM (check option), and at S1100, responds to the user terminal device 100.

The user terminal device provides the user with UI to set scan options, using the information provided by the server device 200. Accordingly, scan options are set. Then at S1110, a scan command including information about the set scan options is transferred to the server device 200.

At S1120, the server device 200 controls the scanner 300 to perform scan job using the transferred information about the scan options. At S1130, the scanner 300 performs scanning, and at S1140, transfers the scan data, and at S1150, the server device 200 transfers the scan data to the user terminal device 100.

At S1160, if the scan data is received, the user terminal device 100 transfers a command to close the scan driver. Accordingly, at S1170, the server device 200 closes the scan driver, and at S1180, notifies the user terminal device 100 about the closure of the scan driver (confirms closure of scan driver).

At S1190, if the user terminal device 100 transfers a command to disconnect, at S1200, the server device 200 unloads the scanner driver and disconnects. At S1210, unloading of the scanner driver is notified to the user terminal device 100 (confirms unloading of scanner driver).

FIG. 10 illustrates a flow of operations of the user terminal device 100, the server device 200 and the scanner 300. Accordingly, no separate flowcharts will be provided to illustrate the processes carried out at the respective components.

The operation of the user terminal device 100 and the operation of the server device 200 as illustrated in FIG. 10 may be carried out by the scan proxy module and the scan stub module.

Although the modules are implemented as software and stored at the storage unit of the respective devices in the examples explained above, this is written only for the illustrate purpose. Accordingly, these are not limited to specific embodiments.

In addition, programs to carry out the methods according to various embodiments may be recorded on various types of recording media and executed. Embodiments can also be implemented by executing computer readable code/instructions in/on a medium/media, e.g., a computer readable medium/media. The medium/media can correspond to any medium/media permitting the storing of the computer readable code/instructions. The medium/media may also include, alone or in combination with the computer readable code/instructions, data files, data structures, and the like. Examples of code/instructions include both machine code, such as produced by a compiler, and files containing higher level code that may be executed by a computing device and the like using an interpreter. In addition, code/instructions may include functional programs and code segments. Codes/instructions are executed carry out the above-mentioned methods may be recorded on various types of computer readable medium/media which are readable by a terminal, such as Random Access Memory (RAM), flash memory, Read Only Memory (ROM), Erasable Programmable ROM (EPROM), Electronically Erasable and Programmable ROM (EEPROM), register, hard disk, removable disk, memory card, USB memory, or CD-ROM. The medium/media may also be a distributed network, so that the computer readable code/instructions are stored and executed in a distributed fashion. The computer readable code/instructions may be executed by one or more processors. The computer readable code/instructions may also be executed and/or embodied in at least one application specific integrated circuit (ASIC) or Field Programmable Gate Array (FPGA).

Although a few embodiments have been shown and described, it would be appreciated by those skilled in the art that changes may be made in these embodiments without departing from the principles and spirit of the disclosure, the scope of which is defined in the claims and their equivalents.

What is claimed is:

1. A server device, comprising:
   a first communication interface unit to connect to a mobile user terminal device;
   a second communication interface unit to connect to scanners;
   a storage unit to store scanner drivers; and
   a control unit to control the first communication interface unit to transfer a scanner list, which is a list of the scanners corresponding to the scanner drivers stored in the storage unit, to the mobile user terminal device,
   wherein the control unit determines if a scanner of the scanners is selected at the mobile user terminal device, then the control unit executes a scanner driver of the scanner drivers corresponding to the selected scanner to perform a scan job, wherein the control unit assigns priorities to the scanners in the scanner list according to whether or not documents are placed on each of the scanners, and generates the scanner list comprising the priorities, and wherein a first priority, which is assigned to a first scanner of the scanners having a document on the first scanner, is a higher priority than a second priority, which is assigned to a second scanner of the scanners which does not have the document or another document placed on the second scanner.

2. The server device of claim 1, wherein, if the scan job is carried out at the selected scanner and scan data is received through the second communication interface unit, the control unit transfers the scan data to the mobile user terminal device via the first communication interface unit.

3. The server device of claim 1, wherein, if the scan job is carried out at the selected scanner and scan data is transferred via the second communication interface unit, the control unit stores the scan data at the storage unit.

4. The server device of claim 1, wherein, if scanner information about the selected scanner selected from the scanner list and scan option information are received through the first interface unit, the control unit controls so that the scanner driver corresponding to the scanner information is loaded and executed, and the scan option information is provided to the executed scanner driver for processing of the scan job according to the scan option information.

5. The server device of claim 4, wherein the control unit closes the scanner driver if the scan job is completed, and unloads the scanner driver if the mobile user terminal device is disconnected.

6. The server device of claim 1, wherein the storage unit stores a scan stub module which is accessible to the scanner driver, and the control unit controls the scanner using the scan stub module to process the scan job.

7. The server device of claim 1, wherein the control unit accumulatively stores scan job history information of the mobile user terminal device that uses the scan job, at the storage unit.

8. The server device of claim 1, wherein the control unit assigns priorities to the respective scanners in the scanner list according to use status of the scanners connected to the second interface unit and generates the scanner list comprising the priorities.

9. A mobile user terminal device, comprising:
a communication interface unit to connect to a server device, and to receive a scanner list of one connected to the server device;
a user interface unit to display the scanner list;
a control unit to control the communication interface unit to transfer information about a selected scanner, which is selected from the displayed scanner list, to the device;
a data processing unit to process scan data, if the scan data is received from the selected scanner through the server; and
a storage unit to store the scan data processed by the data processing unit,
wherein the scanner list is a list of the scanners corresponding to the scanner drivers stored in the server device,
wherein the control unit controls the user interface to display the scanner list comprising priorities assigned to the respective scanners in the scanner list, and
wherein a first priority, which is assigned to a first scanner of the scanners having a document on the first scanner, is higher than a second priority, which is assigned to a second scanner of the scanners that does not have the document or another document placed on the second scanner.

10. The mobile user terminal device of claim 9, wherein:
the storage unit stores therein a scan proxy module,
if a scan command is inputted, the control unit transfers the scan command to the server device,
the scan proxy module is a software module which accesses a scan stub module stored at the server device, and
the scan stub module is a software module which accesses one or more scanner drivers stored at the server device.

11. The mobile user terminal device of claim 9, wherein upon receipt of a scan command, the control unit controls the user interface unit to display a user interface (UI) to receive an identification (ID) and a password, and
controls the communication interface unit to transfer the ID and the password inputted through the UI to the server device.

12. A scan system, comprising:
a server device having scanner drivers; and
a mobile user terminal device to access the server device and to receive a scanner list, and if a scanner is selected from the scanner list, then the mobile user terminal device transfers scanner information about the selected scanner to the server device,
wherein the server device controls the selected scanner to process a scan job using a scanner driver corresponding to the scanner information transferred from the mobile user terminal device,
wherein the scanner list is a list of scanners corresponding to scanner drivers provided at the server device, and
wherein the server device assigns priorities to the scanners in the scanner list according to whether or not documents are placed on the scanners, and generates the scanner list the based on the priorities, and
wherein a first priority, which is assigned to a first scanner of the scanners having a document on the first scanner, is higher than a second priority of a second scanner, which does not have the document or another document placed on the second scanner.

13. The scan system of claim 12, wherein the server device drives a scanner driver corresponding to the selected scanner by executing a scan stub module which can access the one or more scanner drivers, and the mobile user terminal device executes a scan proxy module which can access the scan stub module to access the server device.

14. A method for performing a scan using a server device, the method comprising:
if a mobile user terminal device is connected to the server device, transferring a scanner list, which corresponds to a prestored scanner driver in the server device, to the mobile user terminal device; and
if a scanner is selected at the mobile user terminal device, executing the prestored scanner driver corresponding to the selected scanner, then controlling the selected scanner using the prestored scanner driver to process a scan job,
wherein the scanner list comprises priorities assigned to scanners in the scanner list, and
wherein a first priority, which is assigned to a first scanner of the scanners having a document on the first scanner, is higher than a second priority, which is assigned to a second scanner that does not have the document or another document placed on the second scanner.

15. The method of claim 14, further comprising:
if the scan job is processed at the selected scanner, receiving scan data from the selected scanner; and transferring the scan data to the mobile user terminal device.

16. The method of claim 14, further comprising:
if the scan job is processed at the selected scanner, receiving scan data from the selected scanner; and
storing the received scan data.

17. The method of claim 14, wherein the executing comprises:
receiving scanner information about the scanner selected from the scanner list and scan option information from the mobile user terminal device;
loading a scanner driver corresponding to the scanner information and executing the loaded scanner driver; and
providing the scan option information to the executed scanner driver,
wherein the scanner driver is executed by a scan stub module which can access the scanner driver, and the scan stub module and the scanner driver are connected according to Technology Without an Important Name (TWAIN) or Windows Image Acquisition (WIA).

18. The method of claim 17, further comprising:
if the scan job is completed, closing the scanner driver; and
if the mobile user terminal device is disconnected, unloading the scanner driver.

19. A method for performing a scan using a mobile user terminal device, the method comprising:
connecting to a server device;
receiving a scanner list of scanners from the server device;
displaying the received scanner list;
selecting a scanner of the scanners to use from the scanner list;
transferring information about the selected scanner to the server device;
if scanning is performed at the selected scanner by the scanner driver provided at the server device, then receiving scan data from the selected scanner through the server device; and
storing the received scan data,
wherein the scanner list is a list of the one or more scanners, which corresponds to scanner drivers stored in the server device,
wherein the displaying of the scanner list further comprises displaying the scanner list comprising priorities assigned to the scanners in the scanner list, and
wherein a first priority, which is assigned to a first scanner of the scanners having a document on the first scanner, is higher than a second priority, which is assigned to a second scanner of the scanners that does not have the document or another document placed on the second scanner.

20. A method for performing a scan using a scan system, the method comprising:
accessing, at the mobile user terminal device, a server device;
receiving, at the mobile user terminal device, a scanner list of scanners connected to the server device;
if a scanner of the scanners is selected using the mobile user terminal device, then transferring to the mobile user terminal device, the selected scanner information from the server device; controlling, using the server device, the scanner using the scanner driver corresponding to the scanner information transferred from the mobile user terminal device to thereby process a scan job; and
providing scan data of the scan job to the mobile terminal device from the server device,
wherein the scanner list is a list of scanners corresponding to scanner drivers provided at the server device,
wherein the scanner list comprises priorities assigned to the scanners in the scanner list, and
wherein a first priority, which is assigned to a first scanner of the scanners having the document on the first scanner, is higher than a second priority, which is assigned to a second scanner that does not have the document or another document placed on the second scanner.

* * * * *

UNITED STATES PATENT AND TRADEMARK OFFICE
CERTIFICATE OF CORRECTION

PATENT NO. : 9,204,004 B2
APPLICATION NO. : 13/463091
DATED : December 1, 2015
INVENTOR(S) : Jung-mo Hong et al.

It is certified that error appears in the above-identified patent and that said Letters Patent is hereby corrected as shown below:

In the claims

Claim 9, Column 13, Line 49:
Delete "of one" and insert -- of scanners --, therefor.

Claim 12, Column 14, Line 38:
Delete "list the" and insert -- list --, therefor.

Claim 19, Column 16, Line 2:
Delete "the one or more" and insert -- the --, therefor.

Claim 20, Column 16, Line 15:
Delete "system," and insert -- system comprising a mobile user terminal device, a server device, and a first scanner, --, therefor.

Claim 20, Column 16, Line 17:
Delete "a" and insert -- the --, therefor.

Claim 20, Column 16, Line 34:
Delete "a" and insert -- the --, therefor.

Signed and Sealed this
Twenty-ninth Day of March, 2016

Michelle K. Lee
*Director of the United States Patent and Trademark Office*